United States Patent [19]

Nakajima et al.

[11] Patent Number: 5,448,017
[45] Date of Patent: Sep. 5, 1995

[54] GROMMET

[75] Inventors: Hiroyuki Nakajima; Hiroshi Watanabe, both of Yokkaichi, Japan

[73] Assignee: Sumitomo Wiring Systems, Ltd., Yokkaichi, Japan

[21] Appl. No.: 165,475

[22] Filed: Dec. 13, 1993

[30] Foreign Application Priority Data

Jan. 20, 1993 [JP] Japan ................. 5-001102

[51] Int. Cl.⁶ ............................................. H01B 17/26
[52] U.S. Cl. ...................... 174/152 G; 174/72 A; 174/65 G; 174/152 R
[58] Field of Search .............. 174/152 G, 135, 151, 174/72 A, 152 R, 153 R, 65 G, 65 R; 16/2; 123/169 P, 169 PA; 439/207, 208, 449, 456, 360–367, 369

[56] References Cited

U.S. PATENT DOCUMENTS

| | | | |
|---|---|---|---|
| 3,544,705 | 12/1970 | Winston | 174/65 R X |
| 4,940,424 | 7/1990 | Odbert | 439/369 |
| 5,176,406 | 1/1993 | Straghan | 285/24 |
| 5,276,280 | 1/1994 | Ball | 174/65 R |
| 5,280,134 | 1/1994 | Polic | 174/65 R |
| 5,299,951 | 4/1994 | Blaetz | 439/367 |

FOREIGN PATENT DOCUMENTS

1284827 8/1972 United Kingdom .

*Primary Examiner*—Leo P. Picard
*Assistant Examiner*—Paramita Ghosh
*Attorney, Agent, or Firm*—Sandler, Greenblum & Bernstein

[57] ABSTRACT

A grommet, to be installed on a wire harness penetrating through two panels, comprising: a first member (11) and a second member (12), wherein the wire portion (21) is inserted into the large-diameter portion (15), the rib (22) is brought into contact with the stepped portion (16), and the cut-out portion (17) is engaged by the locking projections (23, 24) by adjusting the lengthwise and circumferential directions of the wire portions (14) and (21), so as to connect the wire portion (14) of the first member (11) and the wire portion (21) of second member (12) with each other.

6 Claims, 8 Drawing Sheets

GROMMET

BACKGROUND OF THE INVENTION

1. Field of the Invention

The present invention relates to a grommet, comprising panel-installing portions disposed at both sides thereof and a wire portion, to be installed on a wire harness of an automobile or the like and more particularly to the grommet to be installed on the wire harness wired in penetration through two panels.

2. Description of the Related Arts

Figure 8:
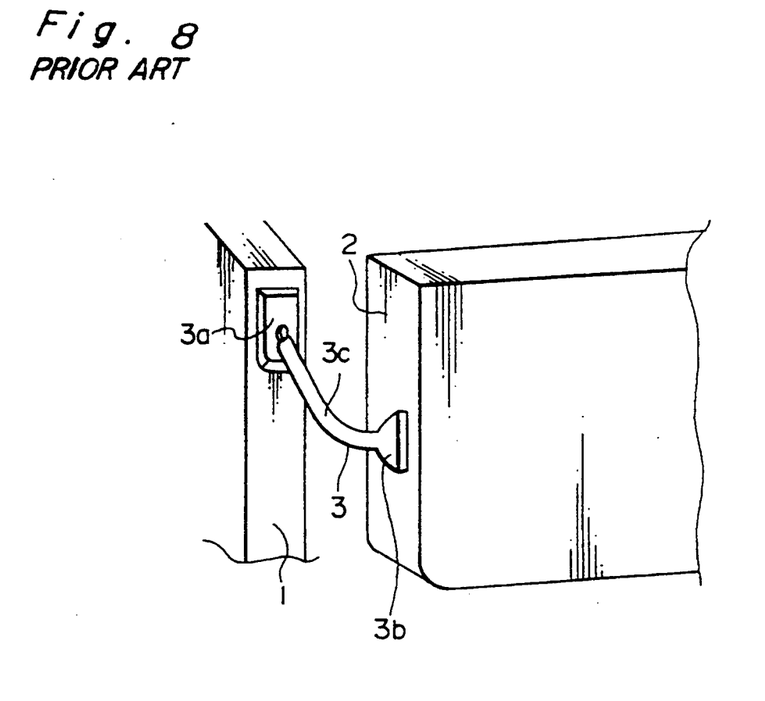
FIG. 8 is a schematic perspective view showing a conventional grommet which has been installed on panels of an automobile.
Figure 9:
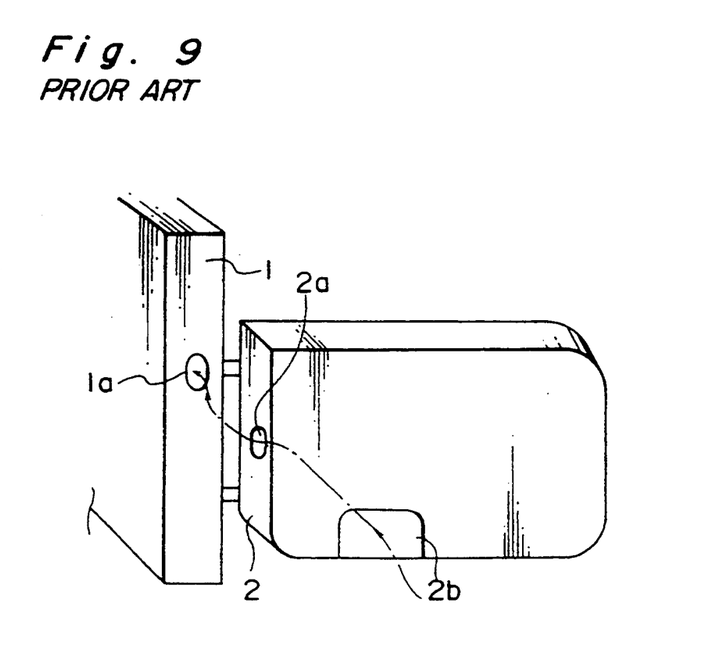
FIG. 9 a schematic perspective view showing a method of installing the conventional grommet on the panels.

As shown in FIGS. 8 and 9, a grommet 3 is installed on a wire harness wired in penetration through a through-hole 1a formed on a body panel 1 of an automobile and a through-hole 2a formed on a door panel 2, so as to prevent water from penetrating into the body panel 1 or the door panel 2 from the through-hole 1a or the through-hole 2a and protect the wire harness disposed between the panel 1 and the door panel 2 from being damaged.

Figure 10:
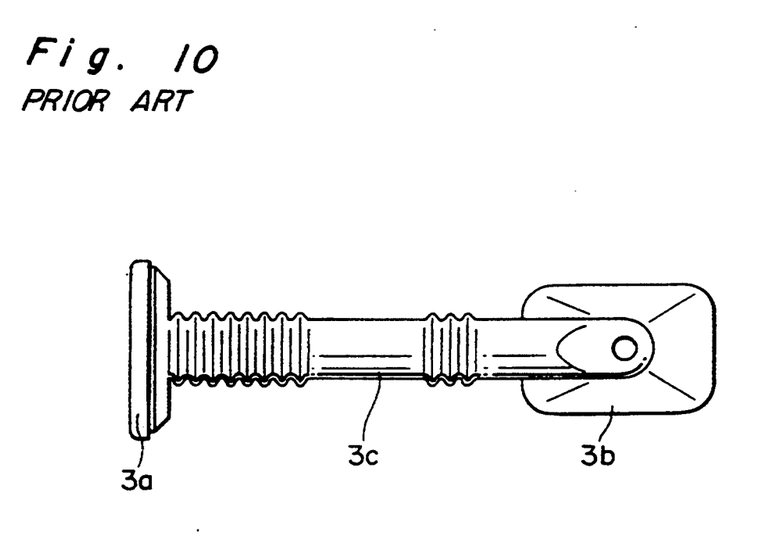
FIG. 10 is a plan view showing the conventional grommet.

Flexible rubber is molded into the grommet 3. The grommet 3 comprises panel-installing portions 3a and 3b disposed at both ends thereof and a wire portion 3c disposed between the panel-installing portions 3a and 3b as shown in FIGS. 8 and 10. The panel-installing portions 3a and 3b and the wire portion 3c are integral with each other.

Figure 11:
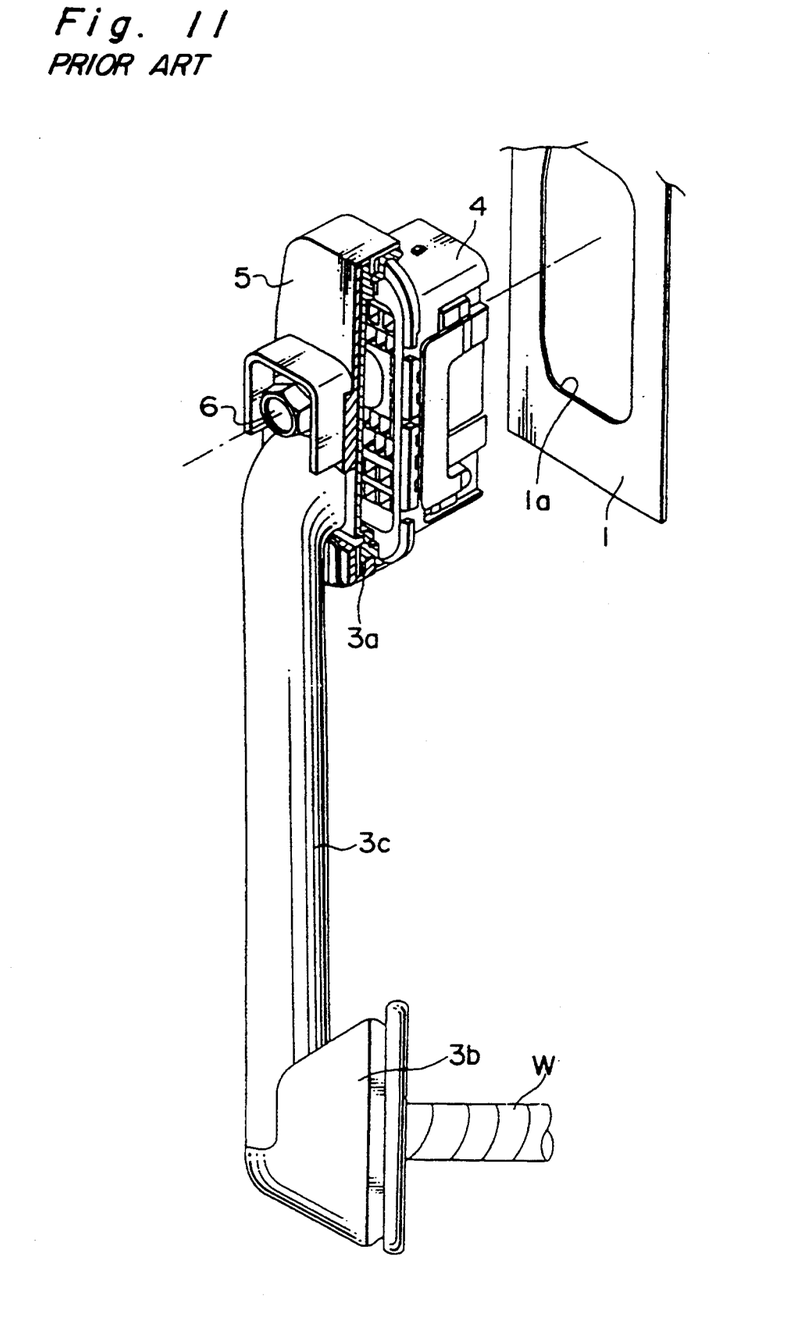
FIG. 11 is a perspective view showing a state in which the conventional grommet has been installed on a wire harness.

More specifically, as shown in FIG. 11, the panel-installing portion 3a of the grommet 3 has a configuration to accommodate a connector 4 to be installed into the body panel 1. One end of the wire portion 3c bent in an approximately L-shaped configuration is continuous with the panel-installing portion 3a. A bundle of electric wires (W) connected with the connector 4 is passed through the wire portion 3c. The other end of the wire portion 3c also bent in an approximately L-shaped configuration is continuous with the panel-installing portion 3b. A door panel-locking portion is installed on the peripheral portion of the panel-installing portion 3b.

In installing the connector 4 and electric wires (W) connected with the connector 4 on the grommet 3, the connector 4 is inserted into the grommet 3 from the panel-installing portion 3b and passed through the wire portion 3c and drawn out at the panel-installing portion 3a. In this installing operation, the connector 4 is installed inside the panel-installing portion 3a, and the electric wires (W) pass through the wire portion 3c and are drawn out from the panel-installing portion 3b.

After the connector 4 is installed on the panel-installing portion 3a, the grommet 3 is covered with a cover 5 made of resin and having rigidity. Then, a bolt 6 is tightened into an opening formed in the connector 4 to fix the connector 4 and the cover 5 to the grommet 3.

Referring to FIG. 9, with the grommet 3 installed on the connector 4 and the electric wires (W) connected with the connector 4, the panel-installing portion 3a is inserted into the door panel 2 from a hole 2b formed on the door panel 2 and passed through the inside of the door panel 2 and drawn out from the through-hole 2a of the door panel 2. Then, the panel-installing portion 3a is positioned on the through-hole 1a of the body panel 1, and the panel-installing portion 3b is locked on the through-hole 2a.

On the body panel 1, a nut (not shown) is tightened on the bolt 6 screwed into the connector 4 (not shown) disposed inside the body panel 1. In this manner, the connector 4 is connected with the body panel 1. The panel-installing portion 3a is fixed to the body panel 1 with the end surface of the panel-installing portion 3a pressed against the outer surface of the body panel 1.

As described above, the grommet installed between the body panel and the door panel comprises the panel-installing portions disposed at both ends thereof and the cylindrical wire portion disposed between the panel-installing portions integral with the wire portion. Thus, it is necessary to insert the connector, connected with a plurality of electric wires, into the grommet from the wire portion disposed on the door panel and pass the connector through the narrow wire portion so as to draw out the connector to the wire portion disposed on the body panel.

In inserting the connector having a great sectional area through the tube-shaped wire portion, the diameter of the wire portion is mechanically enlarged because it is narrow. But it is very difficult to insert the connector through the wire portion and takes much time and labor because the wire portion is long.

In addition, the grommet has a complicated configuration, which necessitates the manufacture of a die having a complicated configuration. Therefore, it is difficult and expensive to manufacture the die.

SUMMARY OF THE INVENTION

It is accordingly an object of the present invention to provide a grommet which allows a connector and a plurality of electric wires connected with the connector to be inserted therethrough easily.

It is another object of the present invention to provide a grommet simple in configuration and which can be manufactured at a low cost.

In accomplishing these and other objects of the present invention, there is provided a grommet, to be installed on a wire harness penetrating through two panels, comprising: a first member and a second member. The first member comprises: a cylindrical wire portion; a panel-installing portion disposed at an end of the wire portion; a large-diameter portion disposed at a leading end of the wire portion of the first member; a stepped portion disposed at an end of the large-diameter portion; and a cut-out portion formed axially in a predetermined length from a leading end of the large-diameter portion. The second member comprises: a cylindrical wire portion and a panel-installing portion disposed at an end of the wire portion; a rib disposed on the peripheral surface of the wire portion at the leading end of the second member; and locking projections engaging the cut-out portion in the direction from a leading end thereof. In this construction, the wire portion is inserted into the large-diameter portion, the rib is brought into contact with the stepped portion, and the cut-out portion is engaged by the locking projections by adjusting the lengthwise and circumferential directions of the wire portions and the cut-out portion. In this manner, the wire portion of the first member and the wire portion of second member are connected with each other.

The cut-out portion is formed by removing the half of the circumference of the large-diameter portion. The locking projections formed on the second member comprise a pair of first projections and a second locking projection. The first projections are brought into contact with each of both side surfaces, of the cut-out portion, extending in the axial direction thereof. The second locking projection, extending circumferentially between both leading ends of the first locking projections, is brought into contact with an inner surface, of the cut-out portion, extending in the circumferential direction thereof.

A first rib projects circumferentially from a leading end of the large-diameter portion. A second rib is formed on the second member in the circumferential direction thereof in such a manner that the distance between the leading end of the wire portion and the second rib is equal to the length of the large-diameter portion. The first and second ribs are brought into contact with each other.

In accommodating a bolt-fastened connector in the panel-installing portion of the first member or that of the second member, a bolt opening is formed on the panel-installing portion.

The wire portion of the first member and that of the second member, integral with each of the panel-installing portions, are formed by bending a material in an L-shaped configuration.

According to the above construction, in installing the grommet comprising the first and second members on the connector accommodating terminals connected with a plurality of electric wires, the connector is inserted into the second member from the panel-installing portion thereof and drawn to the outside via the wire portion of the second member. Then, the connector is inserted into the first member via the large-diameter portion thereof and drawn to the panel-installing portion to bring the panel-installing portion into close contact with the outer surface of the connector.

Thereafter, the wire portions of the first and second members through which a bundle of electric wires has been inserted are connected with each other. That is, the wire portion of the second member is inserted into the large-diameter portion of the first member. At this time, the circumferential position (angular position) of the wire portion is adjusted to a predetermined position. The insertion of the wire portion of the second member into the large-diameter portion is stopped when the rib disposed at the leading end of the second member is brought into contact with the stepped portion of the first member.

As described above, the wire portions of the first and second members are connected with each other at a predetermined position circumferentially with a predetermined overlap length provided therebetween lengthwise. Accordingly, when the panel-installing portions disposed at both ends of the grommet are connected with each other, each of the panel-installing portions form a predetermined angle relative to each of the wire portions and in addition, the wire portions can be connected with each other in a constant length.

A tape is wound around the peripheral surface of the connected portion of the wire portions so as to secure the connection thereof.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

A grommet 10 to be installed on a wire harness is inserted through the through-holes formed on the body panel 1 and the door panel 2 shown in FIG. 9, respectively.

Figure 1:
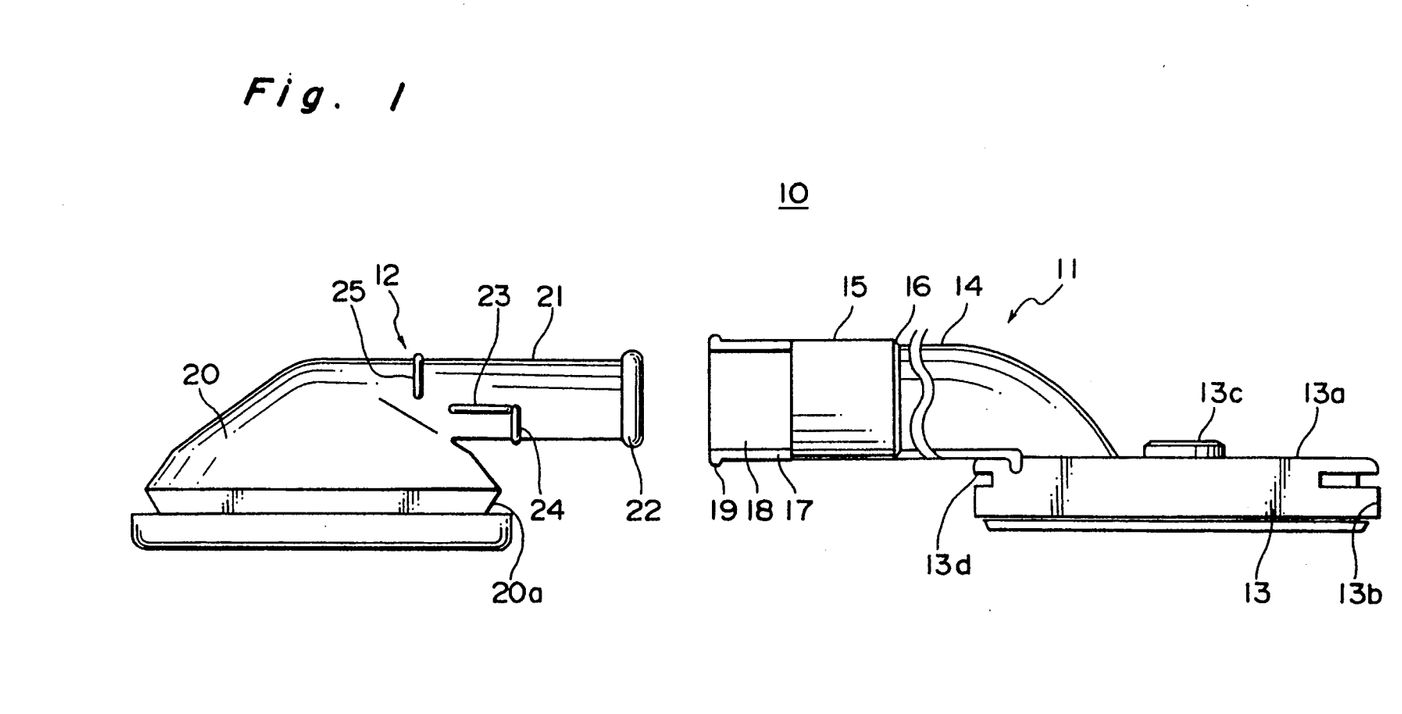
FIG. 1 is a front view showing a grommet according to an embodiment of the present invention.

Referring to FIG. 1, the grommet 10 comprises a first member 11 and a second member 12 both made of flexible rubber and integrally shaped in a die, respectively.

Figure 2A:
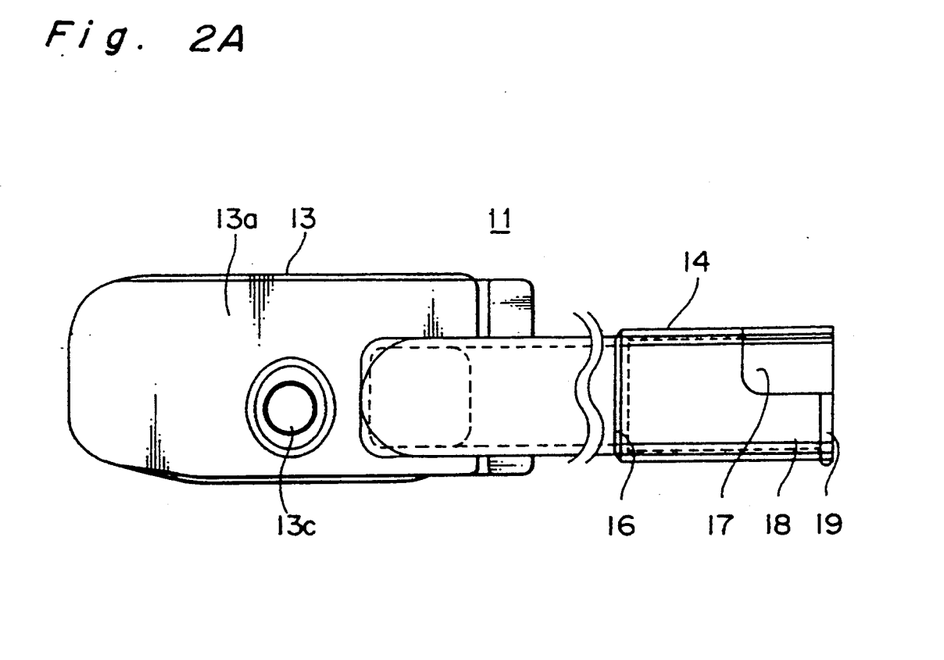
FIG. 2A is a plan view showing a first member according to the embodiment.
Figure 2B:
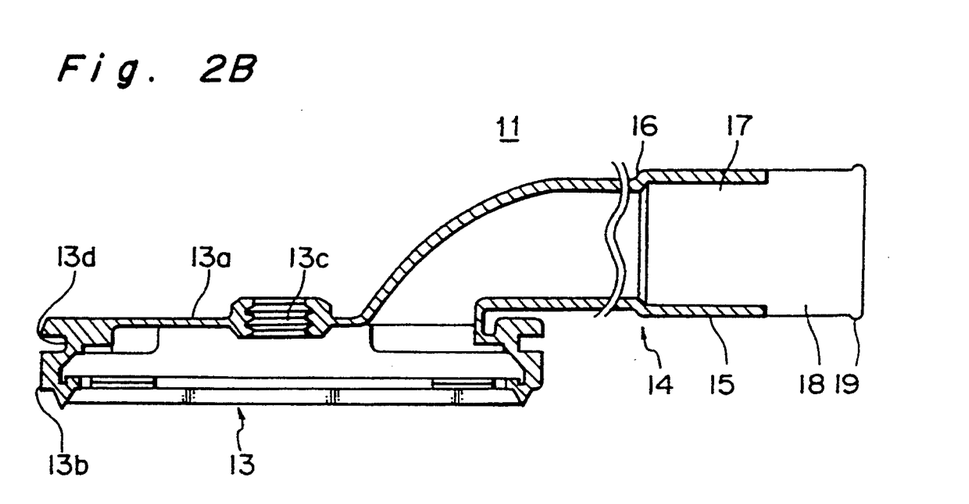
FIG. 2B is a sectional view showing the first member according to the embodiment.

The first member 11 comprises a panel-installing portion 13 installed on a hole formed in a body panel; and a cylindrical wire portion 14 bent in an L-shaped configuration and projecting from the panel-installing portion 13.

The panel-installing portion 13 comprises an outer surface 13a approximately rectangular; a side surface 13b bent from the peripheral surface of the outer surface 13a; a bolt opening 13c formed on the outer surface 13a; and a coverlocking portion 13d formed on the side surface 13b.

The wire portion 14 which is cylindrical projects from a portion of the outer surface 13a integral with the wire portion 14. The wire portion 14 has a diameter large enough to penetrate therethrough a plurality of electric wires connected with a connector 4 to be installed on the panel-installing portion 13.

A large-diameter portion 15 is formed in the vicinity of the leading end of the wire portion 14, with a stepped portion 16 formed at one end of the large-diameter portion 15. A cut-out portion 17 is formed by removing the half of the circumference of the large-diameter portion 15 in a certain length from the leading end of the large-diameter portion 15 in the axial direction thereof. A rib 19 is formed at the leading end of a semicircular portion 18 of the large-diameter portion 15.

Figure 3A:
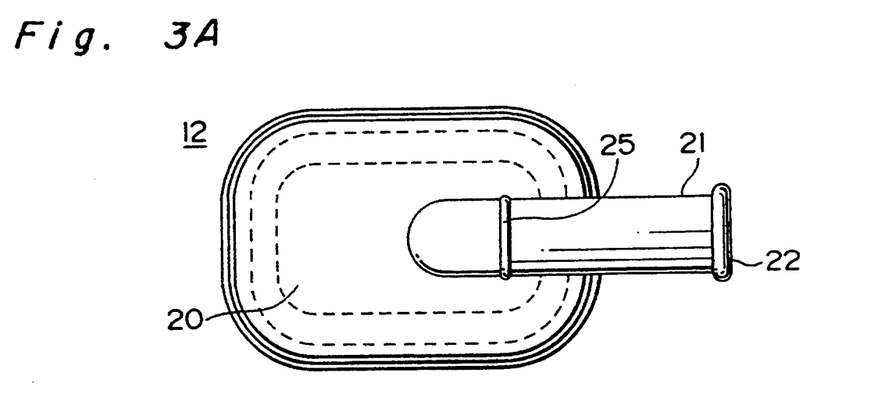
FIG. 3A is a plan view showing a second member according to the embodiment.
Figure 3B:
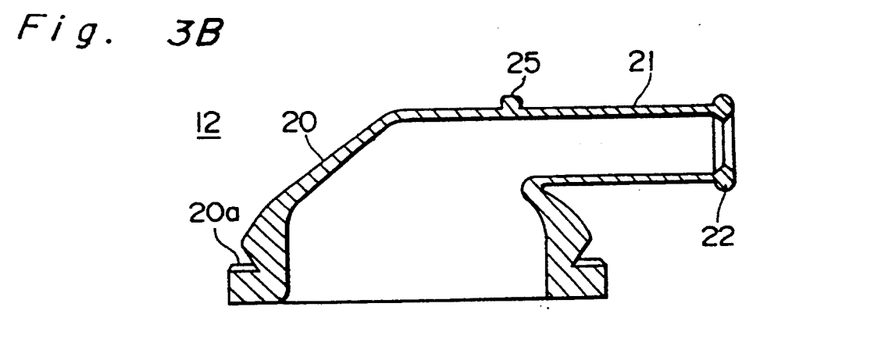
FIG. 3B is a sectional view showing the second member according to the embodiment.

The second member 12 comprises a panel-installing portion 20 to be installed in the door panel; and a cylindrical wire portion 21 bent in an L-shaped configuration and projecting from the panel-installing portion 20.

The panel-installing portion 20 is in approximately a quadrangular pyramidal configuration. A panel locking concave 20a is formed on the peripheral surface of the panel-installing portion 20 at the opening side thereof.

The wire portion 21, which is cylindrical, is continuous with and projects from the leading end of the quadrangular pyramidal panel-installing portion 20.

The wire portion 21 is shorter than the wire portion 14 of the first member 11. A rib 22 is formed on the peripheral surface of the wire portion 21 at the leading end thereof. A pair of first locking projections 23 is formed on the wire portion 21 in a certain length in the axial direction thereof. The first locking projections 23 are apart a certain distance from the leading end of the wire portion 21 and symmetrical with respect to the axis of the wire portion 21. A second locking projection 24 is formed on the wire portion 21 in the circumferential direction thereof. The second locking projection 24 extends circumferentially between both leading ends of the first locking projections 23.

A rib 25 is formed on the wire portion 21 in the circumferential direction thereof in such a manner that the distance between the leading end of the wire portion 21 and the rib 25 is equal to the length of the large-diameter portion 15.

Figure 5:
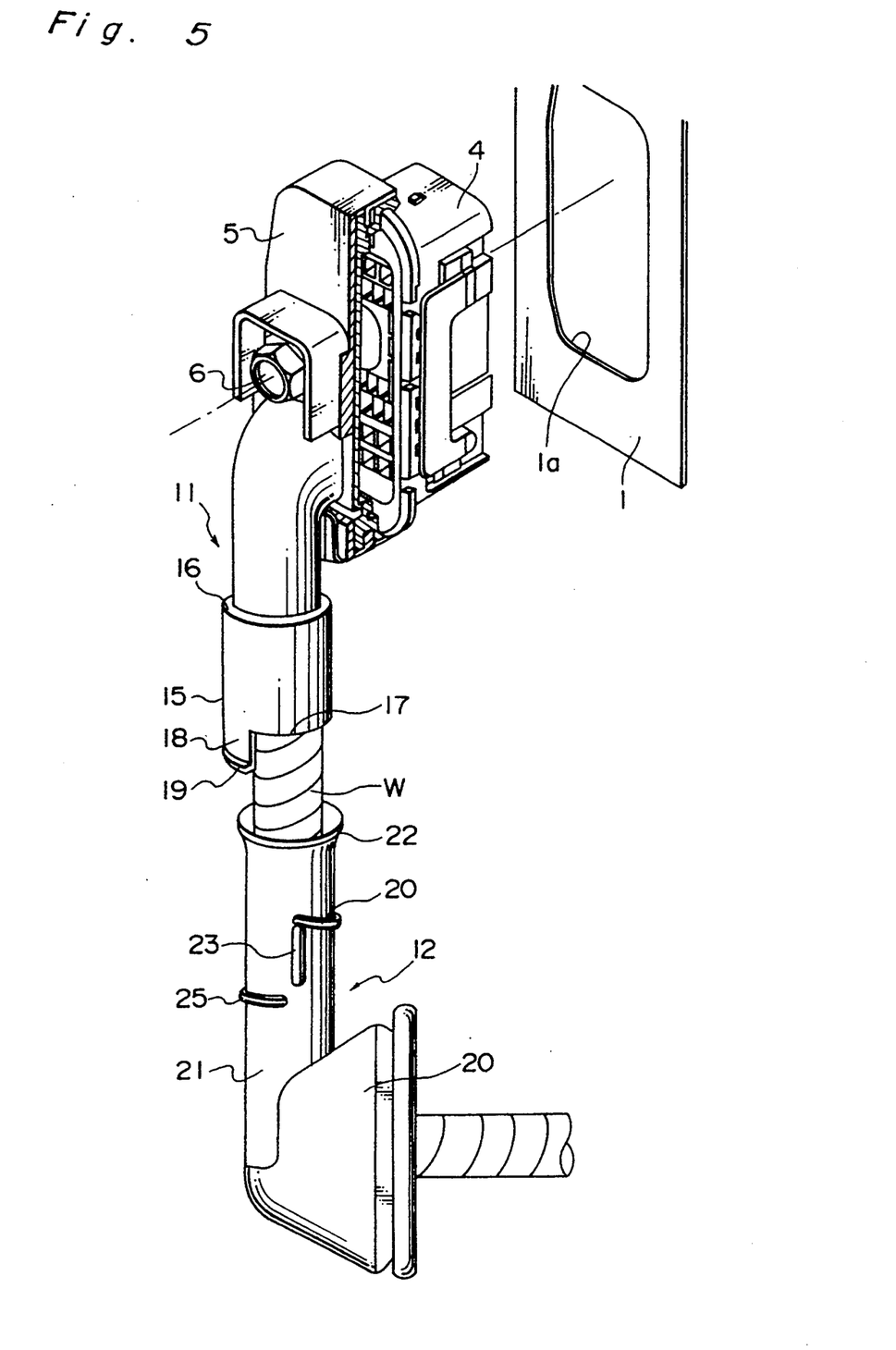
FIG. 5 is a perspective view showing a state in which a wire harness has been inserted through the first member and the second member.

Referring to FIG. 5, the connector 4 connected with a bundle of electric wires (W) is inserted into the second member 12 from the panel-installing portion 20 thereof and drawn to the panel-installing portion 13 via the wire portion 21 of the second member 12 and the wire portion 14 of the first member 1. In this manner, the connector 4 is installed on the panel-installing portion 13.

Figure 4:
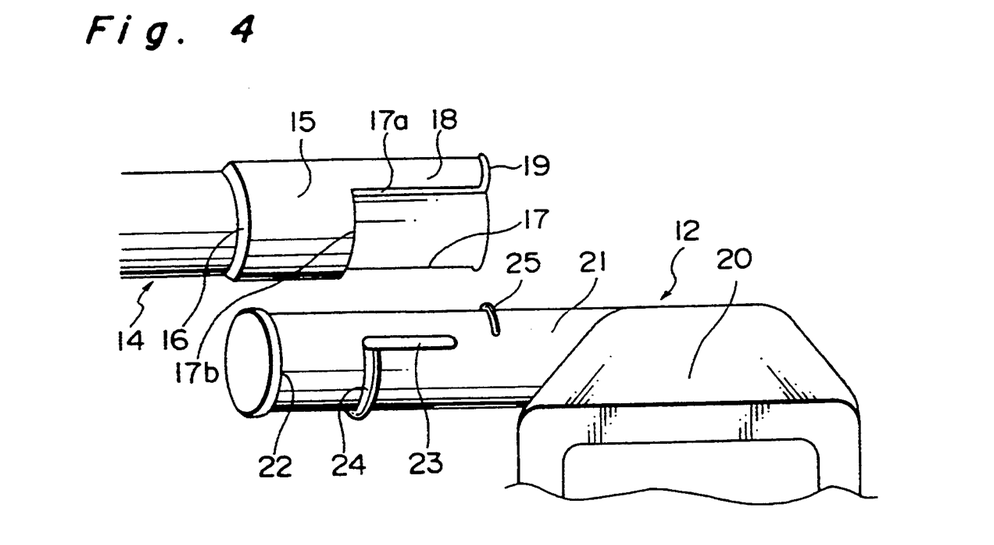
FIG. 4 is a perspective view showing a connecting portion between the first member and the second member.

That is, the wire portion 21 of the second member 12 is inserted into the large-diameter portion 15 of the first member 11 with the bundle of electric wires (W) penetrating through the first and second members 11 and 12. At this time, the circumferential position (angular position) of the wire portion 21 is adjusted to a predetermined position so that each of the first locking projections 23 of the second member 12 is brought into contact with each of both side surfaces 17a of the cut-out portion 17 extending in the axial direction thereof, and the second locking projection 24 of the second member 12 is brought into contact with an inner surface 17b, of the cut-out portion 17, extending in the circumferential direction thereof.

The insertion of the wire portion 21 into the large-diameter portion 15 is stopped when the rib 22 disposed at the leading end of the second member 12 is brought into contact with the stepped portion 16 of the first member 11. As a result, the first locking projections 23 are brought into contact with each of both side surfaces 17a of the cut-out portion 17, and the second locking projection 24 is brought into contact with the inner surface 17b of the cut-out portion 17.

At this time, the rib 19 of the large-diameter portion 15 is brought into contact with the rib 25 projecting from the peripheral surface of the second member 12.

By connecting the wire portions 14 and 21 with each other, the first member 11 and the second member 12 are connected with each other in a predetermined direction circumferentially with a predetermined overlap length provided therebetween lengthwise.

Accordingly, the length of the wire portion 14 and that of the wire portion 21 are kept to be constant, and the panel-installing portion 13 of the first member 11 and the panel-installing portion 20 of the second member 12 are connected with each other with the opening sides thereof forming 90° relative to each other.

Figure 6:
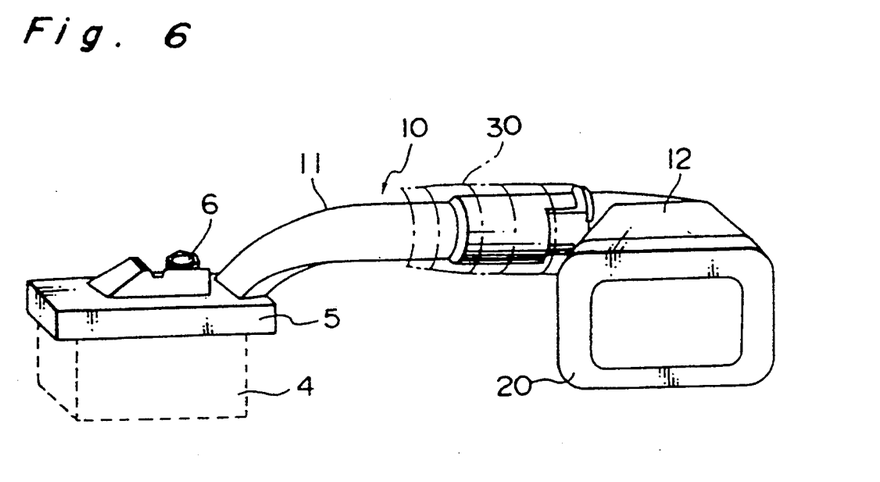
FIG. 6 is a perspective view showing a state in which a tape has been wound around the connecting portion between the first member and the second member.

Then, a tape 30 is wound around the peripheral surface of the connected portion of the wire portions 14 and 21 so as to secure the connection thereof.

Figure 7A:
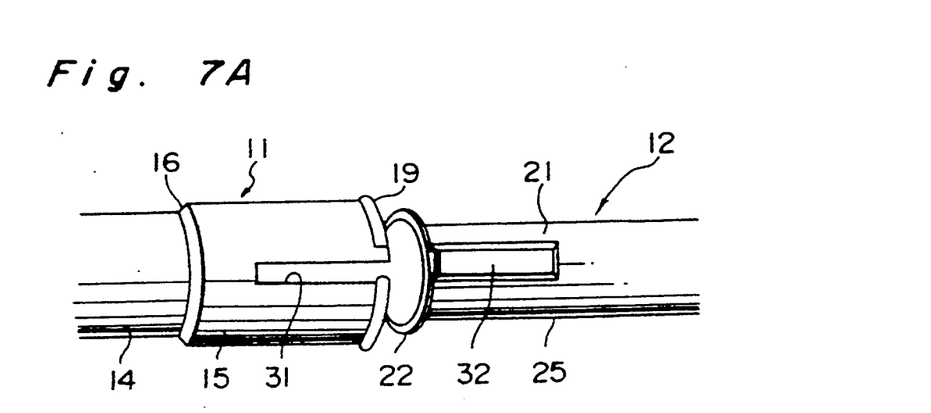
FIG. 7A is a perspective view showing a grommet, of a modification of the present invention, in which a first member and a second member have not been connected with each other.
Figure 7B:
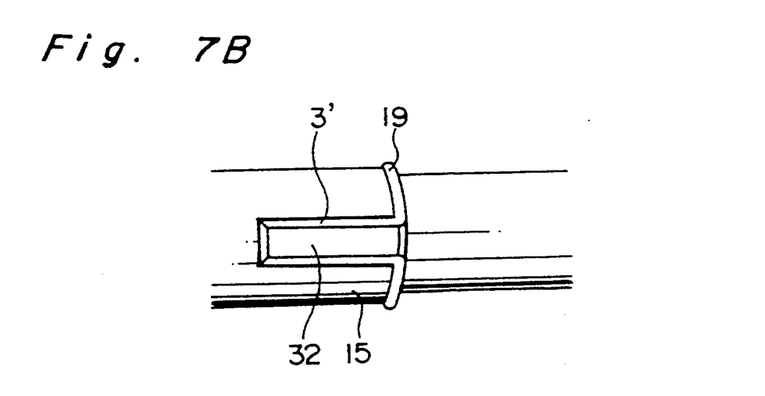
FIG. 7B is a perspective view showing the grommet of FIG. 7A in which the first member and the second member have been connected with each other.

FIGS. 7A and 7B show a modification of the grommet according to the present invention. The grommet of the modification is different from that of the above-described embodiment in the following construction: A slit-shaped cut-out portion 31 is formed on the large-diameter portion 15 in the axial direction thereof. The cut-out portion 31 extends from the leading end of the large-diameter portion 15 continuous with the wire portion 14. A locking projection 32 is formed on the wire portion 21 of the second member 12 in the axial direction thereof.

The locking projection 32 is inserted into the cut-out portion 31 so as to connect the first and second members 11 and 12 with each other. This construction allows the first and second members 11 and 12 to be connected with each other at a predetermined position in the circumferential direction of the wire portions 14 and 21, with a predetermined overlap length provided therebetween lengthwise.

As is apparent from the foregoing description, the grommet to be installed on a wire harness penetrating through two panels comprises two wire portions for connecting the panel-installing portions disposed at both ends of the grommet to each other. Accordingly, short wire portions can be used and thus, operation of expanding short wire portions can be performed more easily than that of expanding long wire portions in penetrating a connector therethrough.

The wires portions of the first and second members are connected with each other at a predetermined position circumferentially with a predetermined overlap length provided therebetween lengthwise. Accordingly, the panel-installing portions integral with the wire portions form a predetermined angle relative to the wire portions and in addition, the wire portions can be connected with each other with a predetermined overlap length provided therebetween lengthwise. Therefore, the wire portions can be kept in a constant length when the wire portions are connected with each other.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed

1. A grommet, to be installed on a wire harness penetrating through two panels, comprising: a first member and a second member, the first member having:
  a cylindrical wire portion having a leading end and a second end;
  a panel-installing portion disposed at the second end of the wire portion;

a large-diameter portion disposed at the leading end of the wire portion of the first member;

a stepped portion disposed at an end of the large-diameter portion; and a cut-out portion formed axially in a predetermined length from a leading end of the large-diameter portion, the cut-out portion occupying substantially one half of the circumference of the large-diameter portion and having two axially-disposed inner surfaces and a third inner surface, and the second member having:

a cylindrical wire portion and a panel-installing portion disposed at an end of the wire portion;

a rib disposed on the peripheral surface of the wire portion at the leading end of the second member; and axially-disposed locking projections comprising a pair of first projections adapted to engage the axially-disposed inner surfaces of the cut-out portion, and a second locking projection, extending circumferentially between the first locking projections and adapted to be brought into contact with the third inner surface, in which:

the wire portion is adapted to be inserted into the large-diameter portion, the rib is adapted to be brought into contact with the stepped portion, and the cut-out portion is adapted to be engaged by the locking projections by adjusting the lengthwise and circumferential direction of the wire portions, so as to connect the wire portion of the first member and the wire portion of the second member.

2. The grommet of claim 1, wherein, the axially-disposed locking projections comprise a first end and a second end and the circumferentially-disposed locking projection extends between the first ends of the axially-disposed locking projections.

3. The grommet of claim 1 wherein the third inner surface of the cut-out portion is circumferentially disposed.

4. A grommet, to be installed on a wire harness penetrating through two panels, comprising: a first member and a second member, the first member having:

a cylindrical wire portion having a leading end and a second end;

a panel-installing portion disposed at the second end of the wire portion;

a large-diameter portion disposed at the leading end of the wire portion of the first member, the leading end including a rib projecting circumferentially therefrom;

a stepped portion disposed at an end of the large-diameter portion; and a cut-out portion formed axially in a predetermined length from a leading end of the large-diameter portion and having an axially-disposed inner surface; and the second member having:

a cylindrical wire portion having a leading end a second end, and a panel-installing portion disposed at the second end of the wire portion;

a first rib disposed on the peripheral surface of the wire portion at the leading end of the second member, and a second rib circumferentially disposed on the peripheral surface of the wire portion of the second member and spaced from the first rib such that the distance between the leading end of the wire portion of the second member and the second rib is equal to the length of the large-diameter portion of the first member;

the second rib on the wire portion of the second member being adapted to contact the rib extending circumferentially from the leading end of the wire portion of the first member; and axially-disposed locking projections adapted to engage the axially-disposed inner surface of the cut-out portion, in which:

the wire portion is adapted to be inserted into the large-diameter portion, the rib is adapted to be brought into contact with the stepped portion, and the cut-out portion is adapted to be engaged by the locking projections by adjusting the lengthwise and circumferential direction of the wire portions, so as to connect the wire portion of the first member and the wire portion of the second member.

5. The grommet of claim 4, wherein the axially-disposed locking projections comprise a first end and a second end and the circumferentially-disposed locking projection extends between the first ends of the axially-disposed locking projections.

6. The grommet of claim 4 wherein the third inner surface of the cut-out portion is circumferentially disposed.

* * * * *